US006971278B2

(12) United States Patent
Robbins et al.

(10) Patent No.: US 6,971,278 B2
(45) Date of Patent: Dec. 6, 2005

(54) MANUAL MULTI-RATIO TENSION-APPLYING DEVICE

(75) Inventors: Paul G. Robbins, Angelica, NY (US); Robert J. Wright, Hornell, NY (US)

(73) Assignee: ALSTOM Transportation, Inc., Hornell, NY (US)

( * ) Notice: Subject to any disclaimer, the term of this patent is extended or adjusted under 35 U.S.C. 154(b) by 191 days.

(21) Appl. No.: 10/339,401

(22) Filed: Jan. 10, 2003

(65) Prior Publication Data

US 2004/0134721 A1 Jul. 15, 2004

(51) Int. Cl.$^7$ ............................................... B66D 1/22
(52) U.S. Cl. ........................... 74/523; 74/524; 74/546; 74/547; 254/342; 254/365; 254/344; 303/1
(58) Field of Search ................... 303/1, 33; 188/133 R; 74/523, 527, 525, 544, 546, 547; 254/342, 254/346, 358, 365

(56) References Cited

U.S. PATENT DOCUMENTS 3,712,155 A * 1/1973 Stommel et al. ........... 74/810.1
4,921,219 A * 5/1990 Ottemann et al. .......... 254/284
5,127,283 A   7/1992 O'Brien et al.
5,842,684 A * 12/1998 Aho ........................... 254/344
6,053,069 A   4/2000 Stroer
6,179,093 B1  1/2001 Daugherty, Jr.

* cited by examiner

Primary Examiner—Matthew C. Graham
(74) Attorney, Agent, or Firm—Sughrue Mion, PLLC

(57) ABSTRACT

A tension applying device including a housing in which are mounted a primary shaft, a main shaft, a pinion shaft, and a load-member sheave shaft. A ratchet handle is associated with the primary shaft for imparting rotation thereto when pumped by a user. Rotation of the primary shaft causes rotation of the main shaft which, in turn, is imparted to the pinion shaft and to a load-member sheave mounted on the load-chain sheave shaft. Rotation of the load-member sheave then applies tension to the load member which, in turn, is connected to a desired application. The tension applying device further includes a plurality of drive mechanisms for achieving different mechanical advantages between the ratchet handle and the load-member sheave, thereby allowing a desired input force to attain a desired output force. Further, the load on the tension member may be used for automatically switching between the plurality of drive mechanisms and for a load limit lock-up.

14 Claims, 7 Drawing Sheets

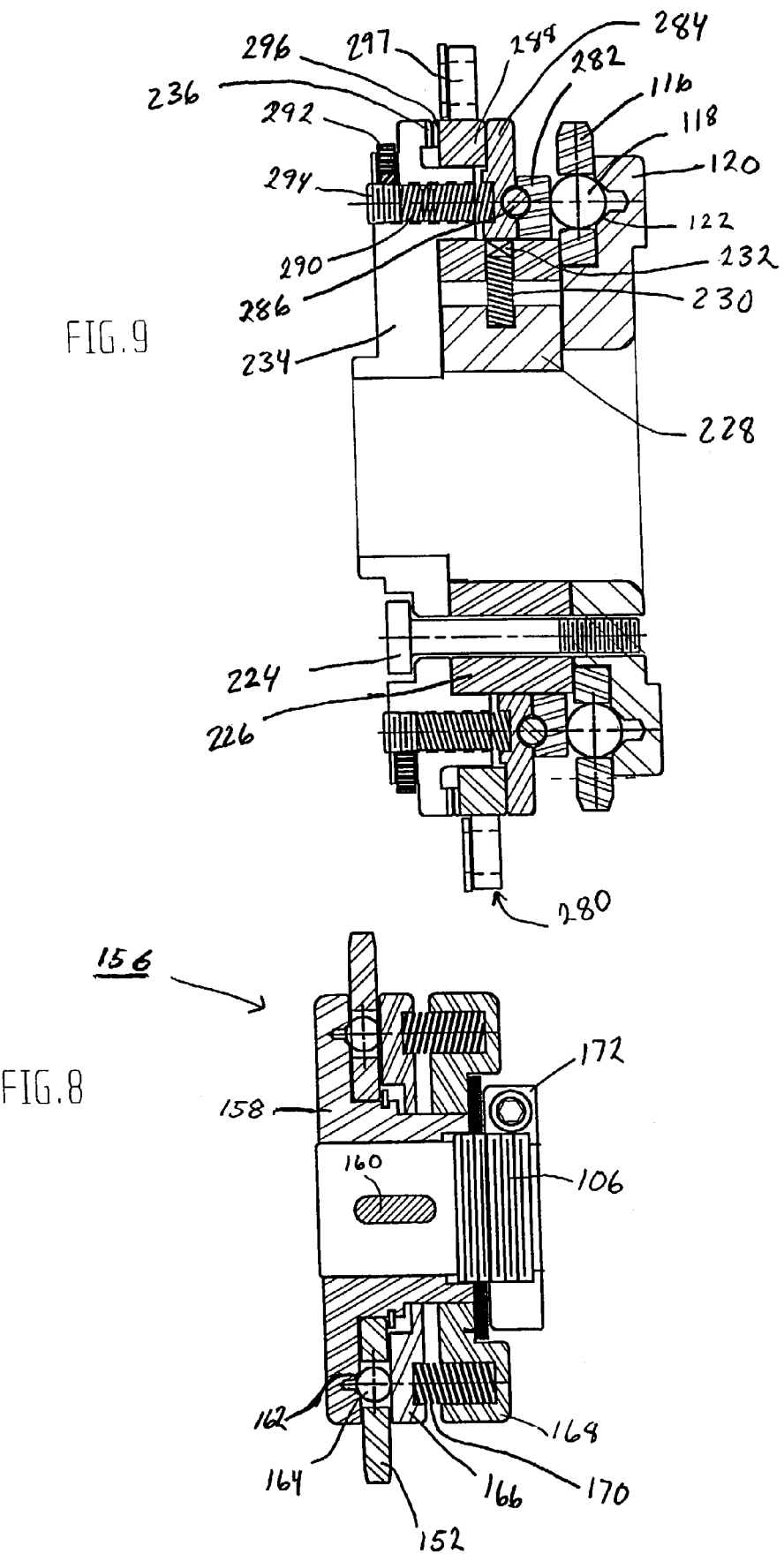

MANUAL MULTI-RATIO TENSION-APPLYING DEVICE

BACKGROUND

1. Field of the Invention

The present invention relates generally to a tension applying device and, more particularly, one that can achieve at least two different aspect ratios on an input side for developing a desired tension on an output side. Further, the present invention relates to hand braking apparatuses for railway cars, to come-alongs, to winches, and the like.

2. Related Art

As is generally well known in the railway industry, when railway cars are taken out of a train and parked at a siding or yard, the hand brakes on at least some of these cars are applied as a precaution against unwanted or unexpected movement of the cars. A typical railway car hand brake system normally includes an apparatus for manually applying and biasing one or more brake shoes against one or more wheels of the railway car by either turning a hand wheel or pumping a ratchet handle on a hand brake mechanism attached to the railway car. The hand brake mechanism is usually a metal gear housing attached to a wall of the railway car and has a rotatable chain drum therein that can be rotated by turning the hand wheel or pumping the ratchet handle to wind a brake chain onto the chain drum. The other end of the brake chain normally extends through the bottom of the gear housing and is interconnected with cables or other linkage to brake shoes, such that winding of the brake chain onto the chain drum will apply tension to the brake chain and linkage as necessary to draw the interconnected brake shoes against adjacent railway car wheels and, accordingly, apply the hand brake as intended.

When applied, the hand brake will put the brake chain and linkage in considerable tension, typically thousands of pounds of force. Therefore, the hand brake mechanism also includes a lock mechanism for locking the chain drum in place when the hand brake has been applied, to thereby maintain the tension in the brake chain and linkage and, accordingly, maintain the hand brake in the applied condition.

Recently, the American Passenger Train Authority (APTA) has issued a new standard requiring that the input force, to move the actuation lever of the hand brake on a passenger train, be 74 pounds or less. This newly lowered force requirement is to make sure that even the least strong rail-yard personnel can properly operate the hand brake. Considering that the hand brake must apply thousands of pounds force to a chain in order to actuate the brakes properly, this is no easy task. Further, in order to have the brakes properly applied, the number of times the ratchet handle must be pumped, or the wheel must be turned, should be kept to a minimum.

Before implementation of the new APTA standard for hand-brake input force, a ratchet handle was pumped about 24 times in order to apply the required tension to the brakes of the railway car. In order to meet the new input-force requirement, it has been thought to reduce the gear ratio in the hand brake. However, such a simple reduction in the gear ratio would increase, in fact approximately double, the number of times that the ratchet must be pumped in order to develop the requisite force on the brake system. But doubling the number of required pumps of the ratchet handle runs the risk that the operator will tire of pumping the handle, and stop before the required force is developed, thereby jeopardizing the safety of all rail-yard personnel.

A significant number of different hand brake mechanisms are generally well known in the railway industry, examples of which are disclosed in U.S. Pat. No. 5,127,283 to O'Brien; U.S. Pat. No. 6,053,069 to Stroer; and U.S. Pat. No. 6,179,093 to Daugherty, Jr. However, to the inventors' knowledge, prior to this invention there have been no hand brakes that meet the new APTA standard for hand-brake input force.

SUMMARY OF THE INVENTION

The present invention has been developed in light of the new APTA standard for hand-brake input force. More specifically, the present invention has been developed to meet the new APTA standard for hand-brake input force, while substantially maintaining the number of times a ratchet must be pumped to develop the requisite output force.

In order to meet the new APTA standard, a hand brake of the present invention employs two different operations upon pumping the ratchet handle. First, the hand brake employs a high-speed low-torque operation in order to take up the slack of the brake chain. Then, once the slack in the brake chain has been taken up, the hand brake switches to a low-speed high-torque operation in order to develop the requisite output force while keeping the input force below the newly set standard of 74 pounds. By switching between high-speed, low-torque operation and low-speed, high-torque operation, the number of times the ratchet handle must be pumped can be kept to a minimum. In fact, according to the concepts of the present invention, the new APTA standard for hand-brake input force can be met wherein the ratchet handle must be pumped only about 24 times—the same as the currently required number of pumps.

Although the present invention has been developed to solve a problem in the railway industry, its concepts readily may be applied to tension applying devices in general, such as come-alongs, winches, and the like. Embodiments of the present invention provide a fast take-up of a tension member combined with a minimum number of strokes for full application of a desired tension. Further, a tension device according to embodiments of the present invention allow a high mechanical advantage, and an automatic switching of mechanical advantages. Still further, the tension device according to embodiments of the present invention allow a low amount of force to develop a great amount of tension in a tension member, but prevent overload of the tension member.

BRIEF DESCRIPTION OF THE DRAWINGS

The above and other objects and advantages of the present invention will become more apparent by describing in detail preferred embodiments thereof with reference to the accompanying drawings, wherein like reference numerals designate like or corresponding parts throughout the several views, and wherein:

FIG. 8 is a view of the high-speed/low-torque driver mechanism having a clutch mechanism, as associated with the primary shaft; and FIG. 9 is a view of the low-speed/high-torque drive, ratchet, and lock-up mechanisms, as associated with the main shaft.

DETAILED DESCRIPTION OF THE PREFERRED EMBODIMENTS

Figure 1:
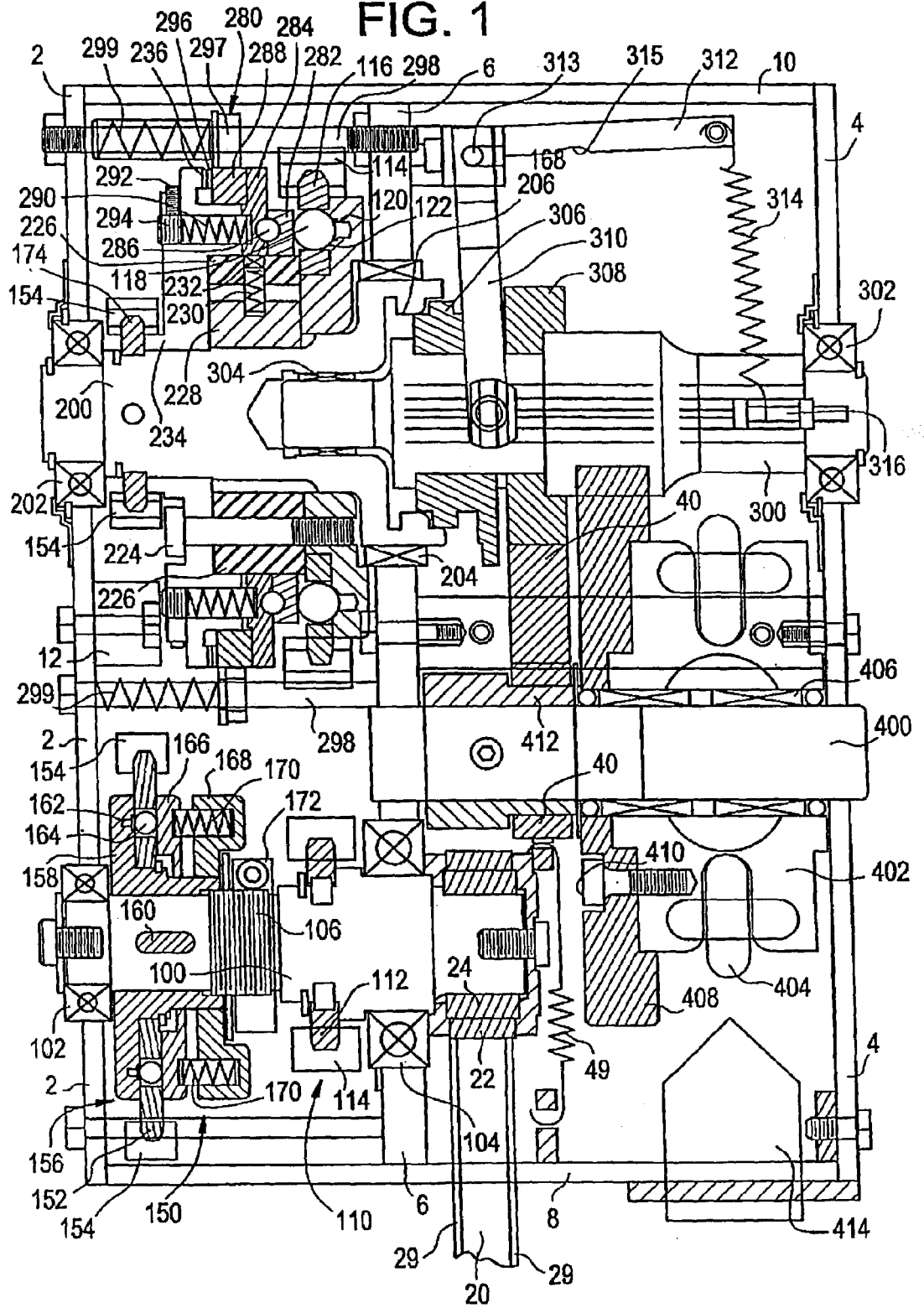
FIG. 1 is a cross-sectional view of tension applying device according to the present invention, as embodied in a hand brake for a railway car.

Embodiments of the present invention will be explained with reference to a hand brake for a railway car. This is a non-limiting example, however, because the concepts of the present invention may be applied to other devices, such as come-alongs, winches, and the like, used for pulling chains or other load members.

One embodiment of the invention is a hand brake for a railway car. The handbrake is generally shown in the figures as element 1, and includes a housing made of side plates 2, 4, a middle plate 6, a bottom plate 8, and a top plate 10. In the housing are mounted a primary shaft 100, a main shaft 200, a pinion shaft 300, and a load-chain sheave shaft 400. In general, a ratchet handle 20 is associated with the primary shaft 100 so that when the ratchet handle 20 is pumped by a user, it imparts rotation to the primary shaft 100. Rotation of the primary shaft 100 causes, through various interconnections described below, rotation of the main shaft 200 which, in turn is imparted to the pinion shaft 300 and to a load-chain sheave 402 mounted on the load-chain sheave shaft 400. Rotation of the load-chain sheave 402 then applies tension to the load chain 404 which, in turn, applies tension to a brake mechanism of the railway car so as to apply the brake and prevent the railway car from moving. In connection with the new APTA standards, an input force of less than 74 pounds applied to pump the ratchet handle 20 about 24 times is enough to apply sufficient tension—thousands of pounds—to the load chain 404 so as to sufficiently apply the brakes to the railway car. Each of the shafts, the components mounted thereto, as well as their interaction and operation, will be described below.

Primary Shaft—100

The primary shaft 100 is mounted by side plate 2 and middle plate 6, by ball bearings 102, 104, respectively, and is rotated by the action of ratchet handle 20. The ratchet handle 20 is connected to the primary shaft 100 by a ratchet mechanism 22, 24 in the manner of a typical socket wrench. That is, the ratchet mechanism 22, 24 engages the movement of the ratchet handle 20 with the primary shaft 100 so as to rotate the primary shaft 100 when the ratchet handle 20 is moved in one direction—for example, counter-clockwise as viewed in FIG. 3—and disengages the movement of the ratchet handle 20 from the primary shaft when the ratchet handle is moved in an opposite direction.

Figure 3:
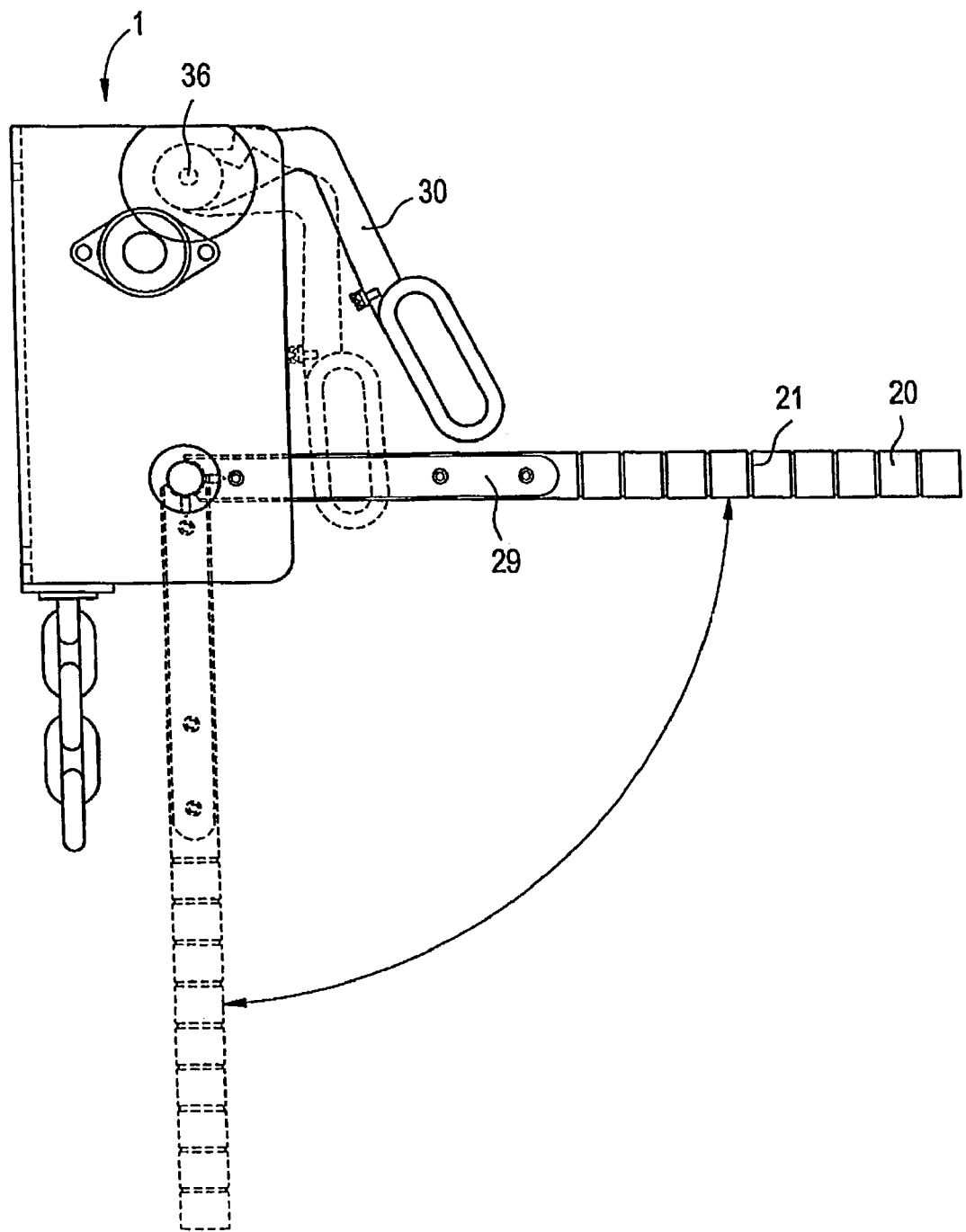
FIG. 3 is a side view of a tension applying device according to the present invention, as embodied in a hand brake for a railway car, showing various positions of the ratchet handle and the release handle.
Figure 6:
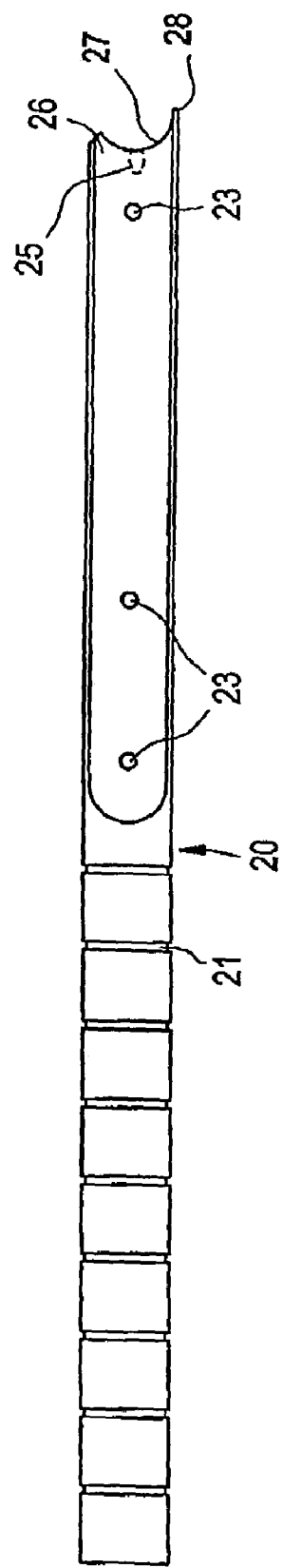
FIG. 6 is a side view of a ratchet handle.

The ratchet handle 20 is best seen in FIGS. 1, 3, and 6, and comprises a grip portion 21, holes 23, an axial hole 25, and an engagement portion comprised of short projection 26, rounded portion 27, and long projection 28. A user may grip portion 21 to pump the ratchet handle. The holes 23 assist in mounting plates 29 of the ratchet mechanism 22, 24, whereas axial hole 25 further assists in mounting the ratchet mechanism 22, 24 on the ratchet handle 20. The short projection 26, rounded portion 27, and long projection 28 interact with the ratchet mechanism 22, 24 to transfer motion of the ratchet handle 20 to the primary shaft 100 in the manner of a socket wrench. The long projection 28 prevents the ratchet latch from reversing with respect to the ratchet mechanism 22, 24 when the ratchet handle 20 is moved in a counter-clockwise direction, as viewed in FIG. 3, to rotate the primary shaft 100. For example, the ratchet handle may be about 24 inches long.

Two drive mechanisms 110 and 150 are associated with the primary shaft 100. The drive mechanism 110 is a low-speed/high-torque drive mechanism, whereas the drive mechanism 150 is high-speed/low-torque. The high-speed/low-torque drive mechanism 150 having a clutch 156, as associated with the primary shaft 100, is shown in FIG. 8. On the other hand, the low-speed/high-torque drive mechanism 110, as it is associated with the main shaft 200, is shown in FIG. 9 together with a ratchet mechanism and lock-up mechanism 280.

On the primary shaft 100, the low-speed/high-torque drive mechanism 110 comprises a sprocket toothed wheel 112 and a roller chain 114.

On the other hand, on the primary shaft 100, the high-speed/low-torque drive mechanism 150 comprises an overdrive sprocket 152 and a roller chain 154 that are connected to the primary shaft 100 by a clutch mechanism 156 that selectively transmits rotation of the primary shaft 100 to the sprocket 152.

The clutch mechanism 156 comprises a clutch hub 158, release balls 164, pressure plate 166, spring cover ring 168, and a clutch adjustment collar 172. The clutch hub 158 is connected to the primary shaft 100, for rotation therewith, by hub key 166. The clutch hub 158 also includes a plurality of ball seats 162 in which balls 164 are disposed. The balls 164 are also disposed in sprocket 152 so that, when they remain seated in ball seats 162, they transmit rotation of the clutch hub 158 to the sprocket 152. A pressure plate 166 is disposed around the primary shaft 100, so as to allow relative rotation therebetween, and so as selectively to engage the balls 164 with the ball seats 162 by application of a certain amount of pressure. The amount of pressure is applied by a plurality of springs 170 disposed between the pressure plate 166 and the spring cover ring 168, which is also disposed around the primary shaft 100 so as to allow relative rotation therebetween. The pressure applied by the pressure plate 166 to the balls 164 is adjustable by varying the spring stiffness of springs 170, as well as adjusting the distance between the spring cover ring 168 and the pressure plate 166. The distance between the spring cover ring 168 and the pressure plate 166 can be adjusted by moving the clutch adjust collar 172 along the axis of the primary shaft 100 by, for example, screw threads 106 that engage the clutch adjust collar 172. The pressure is chosen so that up to a given load on the sprocket 152, the balls 164 remain in seats 162, whereby rotation of the clutch hub 158 imparts rotation to the sprocket 152. After the given load on the sprocket 152 is achieved, further rotation of the primary shaft 100 causes the clutch hub 158 to rotate relative to the sprocket 152 due to the balls 164 being allowed to rise out of their seats 162. The relative rotation between the clutch hub 158 and the sprocket 152 thus disengages the sprocket 152 from rotation of, in turn, the primary shaft 100, the main shaft 200, the pinion shaft 300, and the load-chain sheave 402.

Although the high-speed/low-torque drive mechanism 150 has been described as including a ball-spring type of clutch, any clutch mechanism may be used. Further, although a clutch has been described, any other type of device that allows selective engagement between the high-speed/low-torque drive mechanism 150 and the primary shaft 100 may be used.

Main Shaft—200

The main shaft 200 is mounted to the side plate 2 and middle plate 6 by ball bearings 202 and needle bearings 204, respectively. The low-speed/high-torque drive mechanism 110, and the high-speed/low-torque drive mechanism 150 are also associated with the main shaft 200 so as to transmit rotation of the primary shaft 100 to the main shaft 200.

On the main shaft 200, the high-speed/low-torque drive mechanism 150 comprises a sprocket 174 that is keyed to the main shaft and that is connected to the sprocket 152 by roller chain 154. The size of the sprocket 174 is chosen relative to the size of sprocket 152 so as to give an overdrive of the main shaft 200 with respect to the primary shaft 100, which results in a high-speed/low-torque drive of the main shaft 200 by the primary shaft 100. For example, the sprocket 152 may have 34 teeth when the sprocket 174 has 16 teeth, thereby providing a 2.125 to 1 overdrive ratio.

On the other hand, on the main shaft 200, the low-speed/high-torque drive mechanism 110 comprises a torque-limit sprocket 116 and a torque-limit sprocket hub 120. The sprocket 116 is connected to the sprocket 112 by roller chain 114. Further, roller balls 118, are disposed within the sprocket 116, and are seated on seats 122 in the sprocket hub 120. The sprocket 116 is sized relative to the sprocket 112 so as to provide an underdrive of the main shaft 200 with respect to the primary shaft 100 and, thereby, provide a low-speed/high-torque drive of the main shaft 200 by the primary shaft 100. For example, the sprocket 116 may have 32 teeth when the sprocket 112 has 15 teeth, thereby providing a 2.13 to 1 underdrive ratio. Although the sprockets 152 and 116 are disclosed as having a different number of teeth, such is not necessary. Similarly, although the sprockets 112 and 174 are disclosed as having a different number of teeth, such is not necessary. Instead, the sprocket sizes may be chosen to provide any desired drive ratios. As an example, the present invention may be configured so as to allow a force lower than 50 pounds at the ratchet handle 20 to develop the thousands of pounds force on the load chain 404, as necessary for proper application of the hand brake. Nonetheless, when the sprockets 152 and 174 do not have the same number of teeth, for a given roller chain size, as the sprockets 112 and 116, an eccentric bushing 12—mounted to side plate 2—may be used to tension the slack out of roller chain 154.

Associated with the main-shaft components of drive mechanism 110 there is a ratchet mechanism. The high-speed/low-torque drive mechanism 150 and the low-speed/high-torque drive mechanism 110 are both engaged with the main shaft 200 before the clutch mechanism 156 disengages the high-speed/low-torque drive mechanism 150 from being driven by the primary shaft 100. Before such disengagement, the drive mechanism 150 drives the main shaft 200 faster than does the drive mechanism 110. Therefore, the ratchet mechanism allows slip between rotation of sprocket 116 and rotation of the main shaft 200.

The ratchet mechanism comprises a torque-limit pawl hub 226, and hardened pawl keys 228. Hardened pawl keys 228 are mounted in the pawl hub 226 by pawl springs 230 and pawl-spring holders 232. The pawl keys 228 slip over directional splines on the main shaft 200 so as to allow the main shaft 200 to rotate faster than the pawl hub 226 as when the main shaft 200 is driven by the high-speed/low torque drive 150, yet allow rotation of the pawl hub 226 to drive the main shaft 200 after the clutch 156 disengages the high-speed/low torque drive 150. Retaining screws 224 mount the pawl hub 226, and a serrated cover 234 (to be described later, in connection with a lock-up mechanism 280), to the sprocket hub 120 so that the sprocket hub 120, the pawl hub 226, and the serrated cover 234, rotate together.

Also, associated with the main-shaft components of the drive mechanism 110 there is a lock-up mechanism 280. The lock-up mechanism prevents excessive force from being developed at the load chain 404. That is, because the present invention allows a very low force (less than 74 pounds in accordance with the new APTA standards) applied at the ratchet handle 20 to develop thousands of pounds on the load chain 404, it may be easy to overload the load chain 404. Overloading the load chain 404, i.e., applying too much tension to the load chain 404, may cause significant damage the brake system of a railway car. Therefore, the present invention includes a lock-up mechanism 280.

The lock-up mechanism 280 comprises the serrated cover 234, torque-arm ring 288, pressure plate push disk 284, pressure plate 282, and roller balls 286. The roller balls 286 are mounted between the pressure plate 282 and the pressure plate push disk 284. Springs 290, mounted on the serrated cover 234 by spring adjust set screws 294, bias the pressure plate push disk 284 in a rightward direction as shown in FIG. 1. Also, springs 299 (described later) indirectly bias the pressure plate push disk 284 in a rightward direction. In turn, the pressure plate push disk 284 biases roller balls 286 and pressure plate 282 in a rightward direction. By adjusting the set screws 294, and/or the stiffness of springs 290, 299, a variable amount of pressure may be applied to the pressure plate 282 which, in turn, presses the sprocket roller balls 118 into the seats 122 in sprocket hub 120. The pressure is adjusted to a predetermined level that will cause lock-up before too much tension is applied to the load chain 404.

During normal operation of drive 110, rotation from sprocket 112 is transferred to sprocket 116 by roller chain 114. Roller balls 118 are held within seats 122 by the predetermined pressure from pressure plate 282 and, therefore, rotation of the sprocket 116 rotates sprocket hub 120. Accordingly, through retaining screws 224, rotation of the sprocket hub 120 causes rotation of pawl hub 226 and serrated cover 234. At this stage, the torque-arm ring 288 is biased away from the serrated cover 234 by springs 299. Thus, the serrations 236 on the serrated cover 234 do not engage serrations 296 on the torque-arm ring 288 and, therefore, torque-arm ring 288 remains substantially stationary.

When load on the load chain 404 reaches a predetermined level, pressure from the pressure plate 282 is insufficient to keep roller balls 118 in seats 122. Thus, continued movement of the ratchet handle 20 causes the sprocket 116 to move the roller balls 118 up in their seats 122 and in a leftward manner as viewed in FIG. 1. Although the roller balls 118 move up in their seats 122, they are not completely disengaged from the seats 122. Leftward movement of the roller balls 118 causes, in turn, pressure plate 282, pressure plate push disk 284, and torque-arm ring 288, to also move in a leftward manner, thereby causing torque-arm ring serrations 296 to engage with serrations 236. Engagement of the serrations 296, 236 then causes the torque-arm ring 288 to rotate along with serrated cover 234. However, the torque-arm ring 288 includes projections that engage with stop studs 298, thereby preventing rotation of, in turn, torque-arm ring 288, serrated cover 234, pawl hub 226, sprocket hub 120, the sprocket 116, sprocket 112, and ratchet handle 20. Thus, ratchet handle 20 is prevented from causing any further application of tension to the load chain 404, which prevents overloading of the load chain 404 and the components attached thereto. Such prevention of the ratchet handle 20 from any further application of force gives the user a convenient indication that the hand brake is fully applied. The predetermined load on load chain 404, at which the lock-up mechanism is activated may be adjusted by varying the stiffness of the springs 290 directly acting on pressure plate 284, as well as the stiffness of springs 299 that act on pressure plate 284 by way of contact with torque-arm ring 288. Further adjustment to the force on pressure plate 284 can be made by turning set screws 294.

Although specific types of lock-up, ratchet, high-speed/low-torque drive, and low-speed/high-torque drive, mechanisms have been described, any suitable such mechanisms can be used. Further, although a lock-up is preferred, it may be omitted in favor of a mechanism that merely disengages the main shaft 200 from the ratchet handle 20.

Pinion Shaft—300

The pinion shaft 300 is mounted to side plate 4 by ball bearings 302, and is mounted within an end of main shaft 200 by needle bearings 304.

Further, the pinion shaft 300 is selectively coupled to the main shaft 200, for rotation therewith, by slide coupler 306. Slide coupler 306 is a gear slidable along the pinion shaft 300 so as to engage with, and disengage from, internal parallel tooth profile 206 on the main shaft 200. When the slide coupler 306 engages internal parallel tooth profile 206, the pinion shaft 300 rotates along with the main shaft 200. However, when the slide coupler 306 is moved rightward, as viewed in FIG. 1, it disengages with internal parallel tooth profile 206 so that the pinion shaft may rotate independently of the main shaft 200. A shift fork 310 is connected to the slide coupler 306 and to a lever arm 312, so as to be capable of moving the slide coupler 306 axially along the pinion shaft 300. Pivoting of the lever arm 312 about pin 313 causes the shift fork 310 also to pivot about pin 313. Thus, when the lever arm 312 is moved in a clockwise manner, as viewed in FIG. 1, the shift fork 310 also moves in a clockwise manner and causes the slide coupler 306 to move into engagement with internal parallel tooth profile 206 on the main shaft 200, thereby coupling the pinion shaft 300 with the main shaft 200 for rotation together. The lever arm 312 is normally biased in a clockwise manner by spring 314 attached between the lever arm 312 and a stud 316 mounted on side plate 4. On the other hand, when the lever arm 312 is moved in a counter-clockwise direction (as viewed in FIG. 1), the shift fork 310 also moves in a counter-clockwise direction and causes the slide coupler 306 to move rightward and out of engagement with internal parallel tooth profile 206 on the main shaft 200, thereby allowing the pinion shaft 300 to rotate independently of the main shaft 200. The lever arm 312 is moved in a counter-clockwise manner by a cam 16 mounted on the release handle 30, as described later. See FIGS. 2 and 4. The cam 16 engages with the cam follower 315 to move the lever arm 312 in the counter-clockwise direction.

The pinion shaft 300 also has mounted thereto a pawl wheel 308. A pawl arm 40 engages with the pawl wheel 308 so as selectively to allow rotation of the pinion shaft in a first direction, and prevent rotation thereof in a second, opposite, direction. Also, the pawl arm 40 may be disengaged from the pawl wheel 308 so as to allow rotation of the pinion shaft in the second (opposite) direction.

Pawl Arm—40

Figure 5:
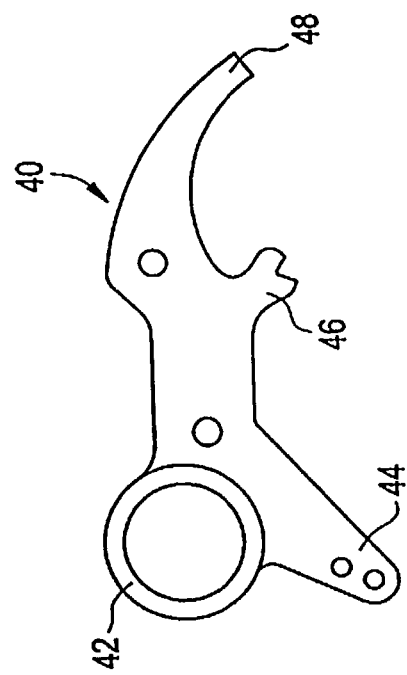
FIG. 5 is a side view of a pawl arm.

The pawl arm 40 is shown in FIG. 5, and comprises a ring portion 42, an arm 44, an engagement member 46, and an extension 48. The ring portion 42 is mounted on load-chain sheave shaft 400, by a pawl step spacer 412, so as to allow the pawl arm 40 to pivot about the shaft 400. The pawl arm 40 can pivot so that engagement member 46 is engaged with the pawl wheel 308 to thereby selectively prevent rotation of the pinion shaft 300 in the second (opposite) direction. Alternatively, the pawl arm 40 can pivot so that engagement (latching) member 46 is disengaged from the pawl wheel 308 to thereby allow rotation of the pinion shaft 300 in the second direction. The pawl arm 40 is normally biased—by a spring 49 mounted between the arm 44 and the bottom plate 8—into engagement with the pawl wheel 308. The pawl arm 40 is pivoted out of engagement (latching) with the pawl wheel 308 when the release arm 30 is rotated so as to pull out on the extension 48.

Release Arm—30

Figure 4:
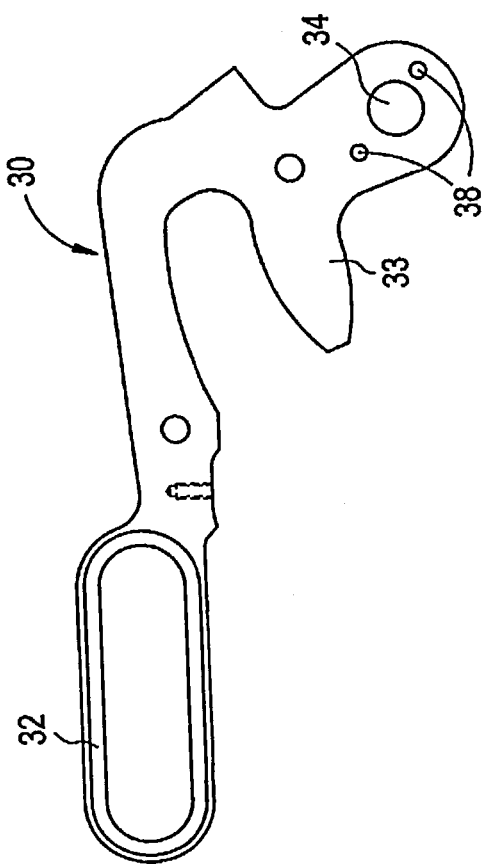
FIG. 4 is a side view of a release handle.

The release arm 30 is shown in FIG. 4, and is movable between a first position as shown in dashed lines in FIG. 3, and a second position as shown in solid lines in FIG. 3.

Figure 2:
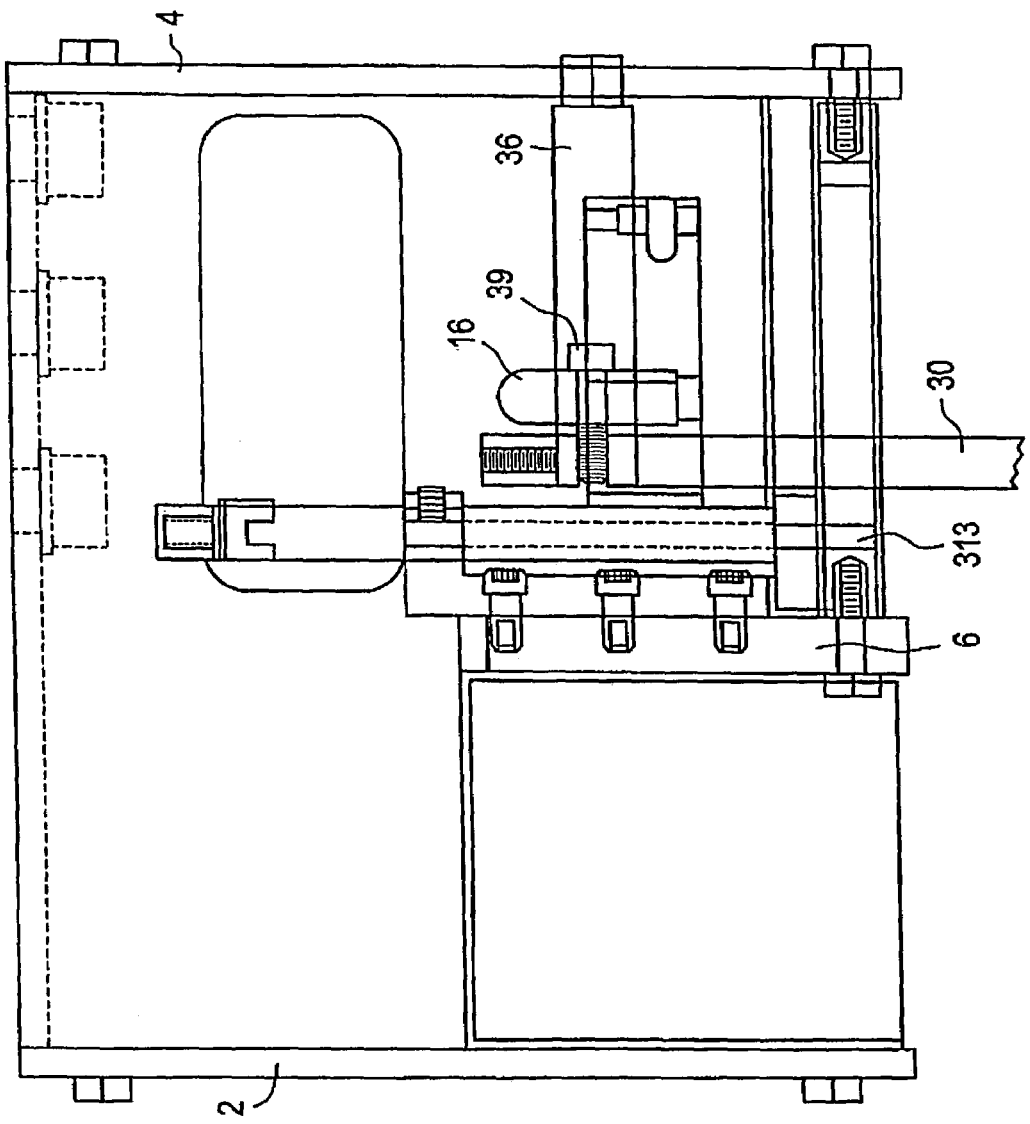
FIG. 2 is a top cut-away view of a tension applying device according to the present invention, as embodied in a hand brake for a railway car.

The release arm 30 comprises a handle portion 32, a hole 34 for mounting the release handle to the rest of the device, a hole 38 for mounting the cam 16, and an engagement portion 33. As shown in FIGS. 2 and 3, the release handle 30 is mounted to a shaft 36 that is disposed between the side plate 4 and middle plate 6 of the housing. The shaft 36 extends through the hole 34 so as to allow the release arm 30 to pivot between its first and second positions.

Movement of the release arm 30 between its first and second positions effects engagement and disengagement of the main 200 and pinion 300 shafts. The cam 16 is mounted to the release handle 30, for movement therewith, by a retaining screw 39 that extends into hole 38. The release handle 30 is normally in its first position, wherein the cam 16 allows the lever arm 312 to be in such a position that the slide coupler 306 is engaged with internal parallel tooth profile 206, thereby coupling the rotation of the main shaft 200 with the pinion shaft 300. On the other hand, when the release arm 30 is moved to its second position, it rotates cam 16 to engage follower 315 and, thereby, force lever arm 312 and shift fork 310 in a counter-clockwise direction which, in turn, disengages the slide coupler 306 from internal parallel tooth profile 206 and, thereby, allows the pinion shaft 300 to rotate independently of the main shaft 200.

Figure 7:
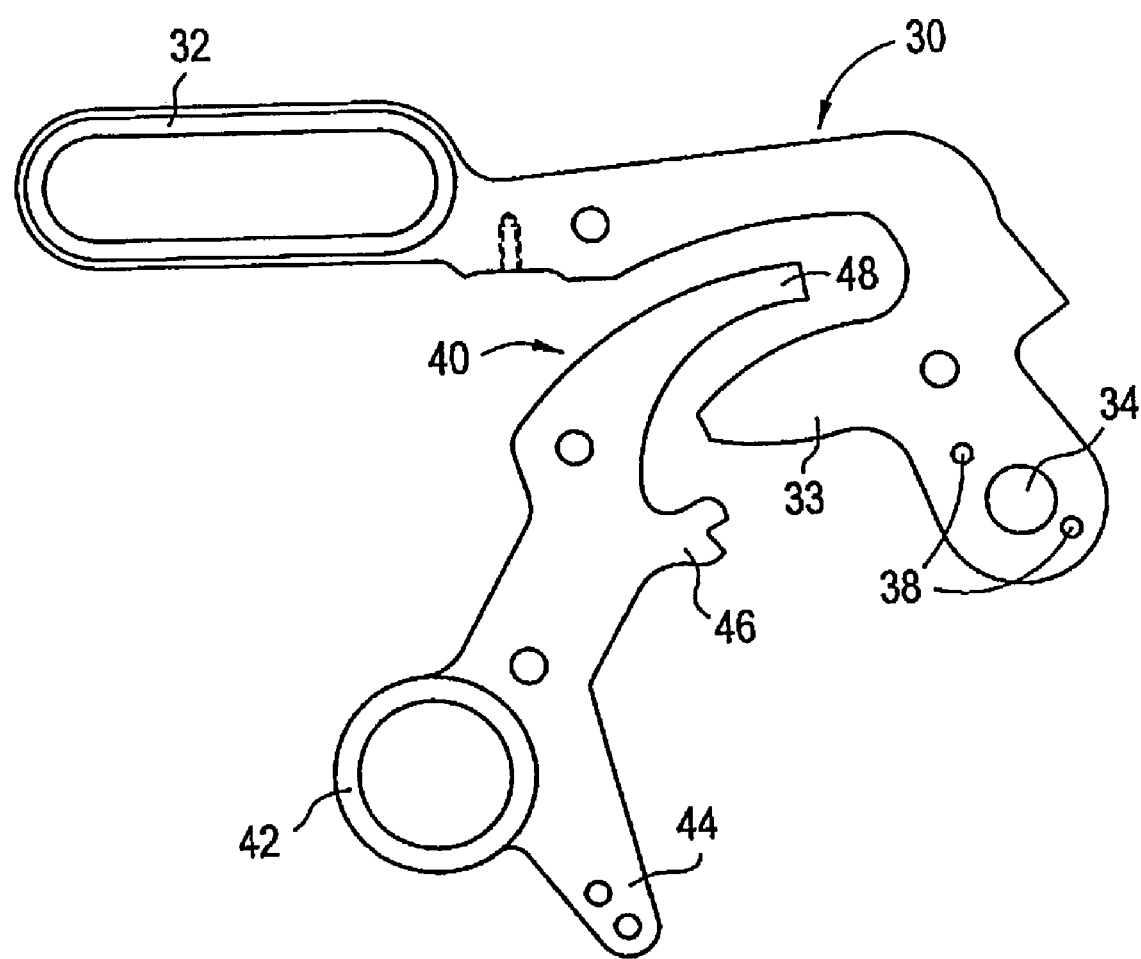
FIG. 7 is a schematic view showing a relationship between the release handle and pawl arm.

Also, movement of the release arm 30 between its first and second positions effects engagement and disengagement of the pawl arm 40 with the pawl wheel 308. When the release arm 30 is in its first position, the engagement (latching) portion 33 allows the pawl arm 40 to be biased into engagement with the pawl wheel 308. On the other hand, when the release arm 30 is moved to its second position, the engagement portion 33 pulls out on the pawl arm's extension 48 and, thereby, pivots the pawl arm 40 out of engagement with the pawl wheel 308. The release arm 30 and pawl arm 40 are shown in relationship to each other in FIG. 7.

The arrangement of the engagement portion 33, and cam mounting hole 38, as well as the arrangement of the cam 16, is such that cooperatively, they effect an engagement timing. The engagement timing is such that upon moving the release arm 30 from its first position to its second position, the slide coupler 306 is disengaged from internal parallel tooth profile 206 before the pawl arm 40 is disengaged from the pawl wheel 308. Therefore, rotation of the load-chain sheave 402 will not be imparted to the components in the left side of the housing or to ratchet handle 20 upon release of the brake mechanism, which is important so as to prevent injury to a user, as discussed below.

Although a screw is disclosed for mounting the cam 16 to the release handle, of course any other suitable method may be used and, in fact, the cam can be made monolithically with the release handle if desired.

Load-Chain Sheave Shaft—400

The load-chain sheave shaft 400 is mounted between the middle plate 6 and the side plate 4. In general, the load-chain sheave shaft 400 does not rotate but, instead, provides a mounting place for the pawl arm 40, as noted above, and for the load-chain sheave 402. The load-chain sheave 402 is rotatably mounted to the load-chain sheave shaft 400 by bearings 406. The load-chain sheave 402 engages a load chain 404 so as selectively to tension the load chain 404 upon rotation thereof in a first direction, and to allow the load chain 404 to be untensioned upon rotation thereof in a second, opposite, direction. The load-chain sheave 402 is connected to a sheave spur gear 408 by retaining screws 410. The sheave spur gear 408 is, in turn, engaged with spur teeth on the pinion shaft 300 for rotation therewith.

Thus, rotation of the pinion shaft 300 is imparted to the load-chain sheave 402 by the sheave spur gear 408. Although the sheave spur gear 408 and the pinion shaft 300 are shown as being engaged for rotation in both directions, a release mechanism could be provided between the load-chain sheave 402 and the pinion shaft 300. Such a release mechanism may be in addition to, or in lieu of, the release mechanism between the pinion shaft 300 and the main shaft 200.

The load chain 404 in this embodiment forms a single loop of engagement with the load-chain sheave 402, whereby one end of the load chain 404 comes from the brake system and is tensioned, whereas the other end of the load chain 404 hangs free off of the sheave 402. The ends of the load chain 404 extend through respective guides 414 mounted in the bottom plate 8 of the housing. Such an arrangement is, however, only exemplary. When the tension device is used as a winch or come-along, for example, the load chain or other tension member may be wound around the load-chain sheave 402 multiple times, and/or both ends thereof may be in tension. In an exemplary embodiment, the size of the load-chain sheave 402, the size of the spur gear 408, the diameters of the pinion shaft 300, and the size of slide coupler 306, can be chosen so that with a 15 tooth sprocket 112 and a 32 tooth sprocket 116, the total underdrive of the primary shaft 100 with respect to the load-chain sheave is 9.05 to 1. For example, the pinion shaft 300 may have an 8-tooth section that engages with a 34-tooth spur gear 408 so as to provide a 4.24 to 1 underdrive of the pinion shaft 300 with respect to the spur gear 408. Such an exemplary total underdrive is sufficient to allow an input force of less than 74 pounds at the ratchet handle 20 to develop a sufficient force of thousands of pounds on the load chain 404 so as correctly to apply the hand brake.

Operation

When the hand brake is not in use, the ratchet handle 20 is at rest in the position shown by dashed lines in FIG. 3. To apply the hand brake, a user grips the ratchet handle 20, and pumps it in an alternating counter-clockwise and clockwise manner (with the directions as viewed in FIG. 3). The rotation of the ratchet handle 20, through ratchet mechanism 22, 24, rotates the primary shaft 100 which, in turn, rotates the clutch hub 158, and sprocket 152. The sprocket 152 drives roller chain 154 which, in turn, drives sprocket 174 that is keyed to the main shaft 200. As the main shaft 200 rotates, the torque necessary to rotate it increases due to the take-up resistance when slack in the load chain 404 is eliminated. The adjustable spring-loaded pressure plate 166 and spring cover ring 168 push and hold the balls 164 in the seats 162 until the pressure from springs 170 is overcome, as when the torque reaches a predetermined level. Then, the balls 164—disposed in holes of sprocket 154 and in seats 162 of the clutch hub 158—stop driving the sprocket 152 as they roll out of and back into the next series of seats 162 in the clutch hub 158. At this point, the drive ratio of the primary shaft 100 to the main shaft 200 switches from an overdrive to an underdrive. The balls 164 continue to roll into and out of the seats 162 as long as the torque resistance is above the predetermined level. As the primary shaft 100 and clutch hub 158 keep rotating through ratcheting of the ratchet handle 20, the primary shaft 100 drives and rotates the sprocket 112 keyed thereto. The sprocket 112 drives sprocket 116 with the roller chain 114. The sprocket 116, sprocket hub 120, and pawl hub 226 rotate to drive pawl keys 228 into engagement with directional drive splines on the main shaft 200, thereby rotating the main shaft 200. Rotation of the main shaft 200 is transferred to the load-chain sheave 402 via, in turn, the slide coupler 306, the pinion shaft 300, and the spur gear 408.

As the torque resistance on the main shaft 200 reaches a maximum desired level, the sprocket 116 starts to rotate relative to the pawl hub 228 and, thereby pushes the balls 118 out of their seats 122 and against the spring-loaded thrust bearing pressure plate 282 and push disk 284. The pressure plate 284 is pushed in a leftward manner, as viewed in FIG. 1, and compresses the springs 290, 299, thereby pushing the torque-arm ring 288 toward the serrated cover 234. As the serrations 296 on the torque-arm ring 288 engage serrations 236 on the serrated cover 234, the torque-arm ring 288 rotates into engagement with studs 298. This stops the main shaft 200 from rotating any further and, thereby, prevents an increase in the load on load-chain 404. In such a manner, the hand brake is locked-up at a pre-set tension. At this point, the primary shaft 100 will not rotate, and the ratchet handle 20 will not swing out or up any further. This is a convenient indication to the operator that the full brake load is applied.

During the above operation, the pawl wheel 308 is rotated by the pinion shaft 300. And the pawl wheel 308 is engaged by pawl arm 40 so as to allow rotation of the pinion shaft 300 in a direction that applies tension to the load chain 404, but so as to prevent reverse rotation of the pinion shaft 300 in a manner that would release tension in the load chain 404. Thus, at the lock-up stage, the hand brake is held in an applied state.

In order to release the hand brake, a user rotates the release handle 30 in a counter-clockwise direction, as viewed in FIG. 3. Upon rotation of the release handle 30 in such a manner, cam 16 engages follower 315 and, thereby is rotates lever 312 in a counter-clockwise direction as viewed in FIG. 1. Rotation of lever 312 causes shift fork 310 also to rotate in a counter-clockwise manner and, thereby, move slide coupler 306 out of engagement with internal parallel tooth profile 206 of the main shaft 200. By disengaging the slide coupler 306 from internal parallel tooth profile 206, rotation of the load-chain sheave 402 is disengaged from the components in the left side of housing and from ratchet handle 20. This is important because upon disengagement of the pawl arm 40 from the pawl wheel 308, the pinion shaft 300 and the load-chain sheave 402 are free to rotate. And because of the great tension previously applied to the load chain 404 during application of the hand brake, the pinion shaft 300 and the load-chain sheave 402 are rotated rapidly upon release. Therefore, it is important to have the slide coupler 306 disengage from internal parallel tooth profile 206 before the pawl arm 40 disengages from pawl wheel 308. If the slide coupler 306 did not disengage internal parallel tooth profile 206 before pawl arm 40 disengaged pawl wheel 308, the rapid reverse rotation of the load-chain sheave 402 would back up the ratchet handle 20 against the bottom stop and put the entire device in a bind and, thereby, potentially injure anyone holding onto, or located under, the ratchet handle 20. Further, the above-described disengagement sequence is advantageous in allowing a rapid release of the hand brake. That is, the mechanisms on the left side of the middle plate 6, as viewed in FIG. 1, would provide a large resistance to, or drag on, the rotation of the load-chain sheave 402. In fact, they may provide so much drag that, as the chain 404 nears its untensioned state, the chain 404 is not completely untensioned, thereby disadvantageously leaving the hand brake in a partially applied state.

It is contemplated that numerous modifications may be made to the manual multi-ratio tension-applying device of the present invention without departing from the spirit and scope of the invention as defined in the following claims.

As a non-limiting example, although a hand brake having two different aspect ratios has been described, any suitable number of aspect ratios more than two may also be used. Additionally, although a load chain has been described, any suitable load member—such as a strap, cable, band, and the like—may be attached to the sheave to receive a load from the sheave. Further, although a sheave has been described, any suitable mechanism—such as a rack—may be used to apply tension to the load member. Further yet, although the device has been described as including ball bearings and needle bearings for a low-friction operation to both apply and release the tension in the tension member, such is only a preferred arrangement. Other manners of mounting the shafts for rotation can still achieve the advantages of the invention as described above. Still further, although the device of the present invention has been explained in terms of a hand brake for railway cars, the present invention is applicable to other types of devices such as come-alongs, winches, and the like.

We claim:

1. A tension applying device comprising:
   a load member;
   a load-member sheave;
   a ratchet handle;
   a gear train interconnecting said load-member sheave and said ratchet handle so that motion of said ratchet handle results in movement of said load member sheave to thereby pull said load member;
   wherein said gear train comprises a first drive mechanism and a second drive mechanism, and further wherein said first drive mechanism provides a different mechanical advantage with respect to said load-member sheave than does said second drive mechanism, and
   wherein said gear train further comprises a slide coupler configured to selectively uncouple said load-member sheave from both said first and second drive mechanisms.

2. A tension applying device as set forth in claim 1, wherein said gear train further comprises a clutch disposed between said first drive mechanism and said ratchet handle, wherein said clutch selectively disengages said first drive mechanism from the motion of said ratchet handle.

3. A tension applying device as set forth in claim 1, wherein said gear train further comprises a ratchet mechanism disposed between said second drive mechanism and said load-member sheave, whereby said second drive mechanism is allowed to slip relative to said first drive mechanism.

4. A tension applying device as set forth in claim 1, further comprising a pawl wheel, associated with said gear train, and a pawi arm pivotally mounted so as to selectively engage and disengage said pawl wheel, whereby engagement of said pawl arm with said pawl wheel prevents rotation of the load-member sheave in one direction.

5. A tension applying device as set forth in claim 1, wherein said gear train further comprises a torque-arm ring that is movable so as to selectively engage said second drive mechanism and, thereby, prevent further motion of said ratchet handle from effecting further movement of said load-member sheave.

6. The tension applying device as set forth in claim 1, in combination with a railway car, wherein said load member is attached to a brake assembly of said railway car.

7. A tension applying device comprising:
   a load member;
   a load-member sheave;
   a ratchet handle;
   a gear train interconnecting said load-member sheave and said ratchet handle so that motion of said ratchet handle results in movement of said load member sheave to thereby pull said load member,
   wherein said gear train comprises a first drive mechanism and a second drive mechanism, and further wherein said first drive mechanism provides a different mechanical advantage with respect to said load-member sheave than does said second drive mechanism,
   wherein said gear train further comprises a slide coupler, whereby said load-member sheave is selectively engaged with said first and second drive mechanisms;
   a pawl wheel, associated with said gear train, and a pawl arm pivotally mounted so as to selectively engage and disengage said pawl wheel, whereby engagement of said pawl arm with said pawl wheel prevents rotation of the load-member sheave in one direction; and
   a release handle pivotally mounted for movement between a first position and a second position, wherein upon pivoting said release handle from said first position to said second position, said release handle engages both of said slide coupler and said pawl arm so as to disengage said load-member sheave from said first and second drive mechanisms before disengaging said pawl arm from said pawl wheel.

8. A tension applying device comprising:
   a load member;
   a load-member sheave;
   a ratchet handle;
   a gear train interconnecting said load-member sheave and said ratchet handle so that movement of said ratchet handle results in movement of said load-member sheave to thereby stress said load member, said gear train comprising a high-speed/low-torque drive, and a low-speed/high-torque drive; and
   means for switching said gear train between said high-speed/low-torque drive and said low-speed/high-torque drive, wherein said means for switching automatically switches said gear train when the torque to move said load-member sheave exceeds a predetermined threshold value.

9. A tension applying device comprising:
   a load member;
   a load-member sheave;
   a ratchet handle;

a gear train interconnecting said load-member sheave and said ratchet handle so that movement of said ratchet handle results in movement of said load-member sheave to thereby stress said load member, said gear train comprising a high-speed/low-torque drive, and a low-speed/high-torque drive;

means for switching said gear train between said high-speed/low-torque drive and said low-speed/high-torque drive; and a lock-up means for preventing further movement of said ratchet handle from effecting further motion of said load-member sheave.

10. A tension applying device comprising:
a load member;
a load-member sheave;
a ratchet handle;
a gear train interconnecting said load-member sheave and said ratchet handle so that movement of said ratchet handle results in movement of said load-member sheave to thereby stress said load member, said gear train comprising a high-speed/low-torque drive, and a low-speed/high-torque drive;

means for switching said gear train between said high-speed/low-torque drive and said low-speed/high-torque drive; and a pawl wheel, associated with said gear train, and a pawl arm pivotally mounted so as to selectively engage and disengage said pawl wheel, whereby engagement of said pawl arm with said pawl wheel prevents rotation of the load-member sheave in one direction.

11. The tension applying device as set forth in claim 10, further comprising a means for disengaging said load-member sheave from said gear train.

12. The tension applying device as set forth in claim 11, further comprising a means for timing disengagement that causes said means for disengaging to disengage said load-member sheave from said gear train before causing said pawl arm to disengage said pawl wheel.

13. The tension applying device as set forth in claim 10, further comprising means for allowing slip of said low-speed/high-torque drive with respect to said high-speed/low-torque drive.

14. The tension applying device as set forth in claim 10, in combination with a railway car, wherein said load member is attached to a brake assembly of said railway car.

* * * * *